US011047957B2

(12) United States Patent
Mikhailov

(10) Patent No.: US 11,047,957 B2
(45) Date of Patent: Jun. 29, 2021

(54) METHOD AND TRAINING SYSTEM FOR TRAINING A RADAR DEVICE

(71) Applicant: Rohde & Schwarz GmbH & Co. KG, Munich (DE)

(72) Inventor: Yassen Mikhailov, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 246 days.

(21) Appl. No.: 16/194,081

(22) Filed: Nov. 16, 2018

(65) Prior Publication Data

US 2020/0158823 A1 May 21, 2020

(51) Int. Cl.
*G01S 7/41* (2006.01)
*G06N 3/08* (2006.01)
*G06N 3/04* (2006.01)

(52) U.S. Cl.
CPC ............ *G01S 7/417* (2013.01); *G06N 3/0454* (2013.01); *G06N 3/088* (2013.01)

(58) Field of Classification Search
CPC . G01S 7/417; G01S 7/40; G01S 7/021; G01S 7/4802; G06N 3/0454; G06N 3/088; G06N 3/0472
See application file for complete search history.

(56) References Cited

U.S. PATENT DOCUMENTS

| | | | |
|---|---|---|---|
| 2009/0102702 A1* | 4/2009 | Oka | G01S 7/032 342/200 |
| 2009/0284409 A1* | 11/2009 | Walker | G01S 7/025 342/174 |
| 2012/0001810 A1* | 1/2012 | Soualle | H01Q 3/267 343/703 |
| 2015/0234037 A1* | 8/2015 | Jaeger | G01S 7/4004 342/173 |
| 2016/0334503 A1* | 11/2016 | Ginsburg | G01S 7/4056 |
| 2017/0307732 A1* | 10/2017 | Haghighi | G01S 13/931 |
| 2019/0094338 A1* | 3/2019 | Fischer | G01S 13/931 |

FOREIGN PATENT DOCUMENTS

WO WO 2010/069349 A1 * 12/2008

* cited by examiner

*Primary Examiner* — Timothy X Pham
(74) *Attorney, Agent, or Firm* — Christensen O'Connor Johnson Kindness PLLC

(57) ABSTRACT

A method for training a radar device using a training system is disclosed. The radar device comprises a first machine learning module to be trained. The training system comprises at least one signal generator, a signal analyzer and at least one controller being connected to both the at least one signal generator and the at least one signal analyzer. The controller causes the at least one signal generator to generate at least one wireless test signal based on an initial set of parameters corresponding to at least one object being located in the field of view of the radar device. The wireless test signal is received by the radar device and a feedback signal is generated by the radar device based on the test signal. The feedback signal is forwarded to the analyzer unit, and the set of parameters is automatically adapted by the controller based on the feedback signal. Moreover, a training system for training a radar device is disclosed.

18 Claims, 1 Drawing Sheet

METHOD AND TRAINING SYSTEM FOR TRAINING A RADAR DEVICE

FIELD OF THE DISCLOSURE

Embodiments of the present disclosure relate generally to a method for training a radar device, a computer program for training a radar device as well as a training system for training a radar device.

BACKGROUND

Radar systems play an important role in many applications such as autonomous cars and airplanes, For example when data acquired by the radar system is used to automatically control certain subsystems of the car or the airplane, or even to completely control all movements of the car or the airplane.

For this purpose, the radar system needs some kind of artificial intelligence being trained to automatically identify objects in the field of view of the radar system and to automatically undertake appropriate actions based on the identified objects if necessary.

The training of the radar systems can be a quite time-consuming task, as there are many different types of radar systems on the market and several different training scenarios have to be set up manually for each of them.

Thus, there is a need for a method as well as for a training system for training a radar system that are adaptable to train different radar devices in a time-saving, uncomplicated and cost efficient manner.

SUMMARY

Embodiments of the present disclosure provide a method for training a radar device using a training system. The radar device comprises a first machine learning module to be trained. The training system comprises at least one signal generator, a signal analyzer and at least one controller being connected to both the at least one signal generator and the at least one signal analyzer. The controller causes the at least one signal generator to generate at least one wireless test signal based on an initial set of parameters corresponding to at least one object being located in the field of view of the radar device. The wireless test signal is received by the radar device and a feedback signal is generated by the radar device based on the test signal. The feedback signal is forwarded to the analyzer unit, and the set of parameters is automatically adapted by the controller based on the feedback signal.

Therein and in the following, the term "field of view of the radar device" is understood to mean three-dimensional space around the radar device from which the radar device can receive radio frequency (RF) signals, For example in the frequency range of operation of the radar device, which may be up to the $K_a$ band, i.e. up to about 40 GHz.

In other words, the controller controls the at least one signal generator to simulate an electromagnetic environment corresponding to a particular situation the radar device may be in. Such a situation usually comprises several objects emitting and/or reflecting electromagnetic waves such that usually there are signals reaching the radar device from several different angles of arrival and directions of arrival, wherein the test signal represents that particular situation. Such a simulator may also be called "pulse sequencer".

The first machine learning module tries to identify and/or classify a source or sources of the test signal. In some embodiments, the machine learning module identifies and classifies the sources into categories being relevant to a particular kind of vehicle the radar device is built into. Such categories may be pedestrians, road marks and/or other traffic participants in the case of the vehicle being a car, or other airplanes, mountains and/or other changes in landscape in the case of the vehicle being an airplane. Thereby and in the following, the term "vehicle" is understood to include all kinds of airborne, land-based and waterborne vehicles.

Moreover, the first machine learning module may evaluate whether a subsystem of the vehicle or the vehicle as a whole have to be controlled in a certain way in response to the test signal.

The feedback signal is a representation of the response of the radar device to test signal. In some embodiments, the feedback signal comprises all relevant information on how the radar device reacts to the test signal. By comparing the feedback signal to the actual situation being simulated, the first machine learning module may be trained employing machine learning techniques.

According to the disclosure, the controller automatically adapts the set of parameters such that the first machine learning module is automatically trained to correctly identify different situations without further input of a user being needed. Put differently, several different electromagnetic environments are used for training the radar device consecutively without any input of the user, although the user may of course be allowed to set up at least part of the set of parameters manually. Thus, a time-saving and uncomplicated method for training the radar device is provided.

According to one aspect of the disclosure, the set of parameters comprises information on at least one of a number of objects, a radar cross section of the at least one object, a position of the at least one object, a velocity of the at least one object, an acceleration of the at least one object, an emission characteristic of the at least one object, a communication signal, an interfering transmitter and background noise. Correspondingly, the controller causes the signal generators to simulate the reflection of radar pulses (sent out by the radar device) by objects located in the field of view of the radar device, an active emission of signals by the at least one object, for example in the form of a communication signal or of an interference signal, and/or electromagnetic background noise being present in the field of view of the radar device. Usually, several objects have to be simulated at once such that the set of parameters comprises information on several objects.

According to a further aspect of the disclosure, the test signal is adjusted based on the adapted parameter set, wherein the adjustment comprises changing at least one of a frequency of the test signal, an amplitude of the test signal, a waveform of the test signal, an emission mode (e.g. pulsed or continuous, pure reflection or active transmission by the object), a power level of the test signal and a pulse width of the test signal. The term "changing the frequency of the test signal" is understood to both include frequency hops, i.e. sudden and larger changes in frequency, as well as smaller changes in frequency. Put differently, an evolving electromagnetic environment is simulated in which several parameters of the set parameters may change. Examples for such changes being simulated are other vehicles or other objects changing direction and/or accelerating, new objects appearing in the field of view of the radar device, objects changing their transmission frequency etc. The change of the set parameters may reflect an evolution of a particular electromagnetic environment or a complete change of electromagnetic environment, i.e. a completely different situation.

The initial set of parameters may be at least one of generated by the controller, loaded from a database stored in a memory of the training system, read from a storage medium and manually input by a user. Thus, the controller may be configured to simulate an electromagnetic environment without further external input or may fetch the data needed from a database. The storage medium may be part of the training system or may be part of a remote server to which the training system is connected in a signal transmitting manner.

In some embodiments, the controller comprises a second machine learning module, wherein the set of parameters is automatically adapted by the second machine learning module. The second machine learning module enables the controller to learn how to train the radar device in a particularly fast and/or efficient manner, for example a cognitive radar device, namely a radar device having a machine learning module. Moreover, the second machine learning module also enables the controller to learn how to train different types of radar devices, such that the training system can easily be adapted to train the different kinds of radar devices.

In a certain embodiment of the disclosure, the first machine learning module and the second machine learning module are both trained unsupervised. Thus, the radar device and also the training system itself can be trained without an expert being needed for setting up the training parameter, which makes handling the training system much less complicated.

According to another aspect of the disclosure, the first and second machine learning modules form kind of a generative adversarial network. The term "kind of a generative adversarial network" is understood to mean the following: The first machine learning module tries to correctly identify and/or classify the information contained in the test signal and/or to generate an appropriate response of the vehicle. At the same time, the second machine learning module tries to generate a set of parameters that leads to errors of the first machine learning module being as big as possible. Put another way, the second machine learning module learns how to generate sets of parameters that are particularly hard to identify for the first machine learning module. This way, the two machine learning modules sort of train each other without further input of the user being needed.

The first machine learning module and the second machine learning module may each comprise an artificial neural network, wherein the two artificial neural networks form the generative adversarial network. More specifically, the artificial neural network of the first machine learning module tries to correctly identify and/or classify the information contained in the test signal and/or to generate an appropriate response of the vehicle. At the same time, the artificial neural network of the second machine learning module tries to generate a set of parameters that leads to errors of the first machine learning module being as big as possible. Put another way, the artificial neural network of the second machine learning module learns how to generate sets of parameters that are particularly hard to identify for the artificial neural network of the first machine learning module. This way, the two artificial neural networks sort of train each other without input of a user being needed.

Embodiments of the present disclosure also provide a computer program for training a radar device using a training system. The radar device comprises a first machine learning module to be trained. The training system comprises at least one signal generator, a signal analyzer and at least one controller being connected to both the at least one signal generator and the at least one signal analyzer. The computer program comprises a program code being adapted to cause the training system to perform the following steps when the computer program is run on the at least one controller:

generating at least one wireless test signal via the at least one signal generator based on an initial set of parameters corresponding to at least one object being located in the field of view of the radar device; and automatically adapting the set of parameters based on a feedback signal being generated by the radar device based on the test signal and being forwarded to the analyzer unit.

According to the disclosure, the computer program automatically adapts the set of parameters, such that the first machine learning module is automatically trained to correctly identify different situations without further input of a user being needed. Put differently, several different electromagnetic environments are used for the training of the radar device consecutively without any interference of user, although the user may of course be allowed to set up at least part of the set of parameters manually. Thus, a time-saving and uncomplicated method for training the radar device is provided that is performed when the computer program is run on the controller. With regards to the remaining advantages, reference is made to the explanations given above regarding the method for training the radar device.

The computer program may be stored on a computer readable medium, such that it can be executed when the computer readable medium is connected to the controller or a controller of another training system.

The computer program may further comprise a program code being adapted to cause the training system to at least one of generate the initial set of parameters, load the initial set of parameters from a database stored in a memory of the training system and read the initial set of parameters from a storage medium when the computer program is run on the at least one controller. Thus, the computer program may be configured to simulate an electromagnetic environment without further external input or may fetch the data needed from a database. The storage medium may be part of the training system or may be part of a remote server to which the training system is connected in a signal transmitting manner.

According to one aspect of the disclosure, the computer program is at least partly established as a second machine learning module being configured to automatically adapt the set of parameters. Thus, at least part of the computer program is configured to learn how to train the radar device in a particularly fast and/or efficient manner. Moreover, the computer program is configured to learn how to train different types of radar devices, such that the training system can easily be adapted to train the different kinds of radar devices by teaching the computer program how to train that particular radar system, e.g. with known machine learning techniques.

According to another aspect of the disclosure, the computer program is at least partly established as an artificial neural network, wherein the first machine learning module comprises another artificial neural network, and wherein the two artificial neural networks together form a generative adversarial network. More specifically, the artificial neural network of the first machine learning module tries to correctly identify and/or classify the information contained in the test signal and/or to generate an appropriate response of the vehicle. At the same time, the artificial neural network of the second machine learning module tries to generate a set of parameters that leads to errors of the first machine learning module being as big as possible. Put another way, the artificial neural network of the second machine learning module learns how to generate sets of parameters that are particularly hard to identify for the artificial neural network of the first machine learning module. This way, the two artificial neural networks sort of train each other without further input of a user being needed.

Embodiments of the present disclosure also provide a training system for training a radar device. The radar device comprises a first machine learning module to be trained. The training system comprises at least one signal generator, a signal analyzer and at least one controller being connected to both the at least one signal generator and the at least one signal analyzer. The controller is configured to control the at least one signal generator to generate at least one wireless test signal based on an initial set of parameters corresponding to at least one object being located in the field of view of the radar device. The radar device is configured to receive and process the test signal to generate a feedback signal. Further, the radar device is configured to forward the feedback signal to the analyzer unit. The controller further is configured to automatically adapt the set of parameters based on the feedback signal.

According to the disclosure, the controller automatically adapts the set of parameters, such that the first machine learning module is automatically trained to correctly identify different situations without further input of a user being needed. Put differently, several different electromagnetic environments are used for the training of the radar device consecutively without any input of user, even if the user may of course be allowed to set up at least part of the set of parameters manually. Thus, a training system being capable of performing a time-saving and uncomplicated method for training the radar device is provided. With regards to the remaining advantages, reference is made to the explanations given above regarding the method for training the radar device and the computer program for training the radar device.

The training system may comprise several signal generators, at least one combiner and at least one transmission antenna, wherein the at least one transmission antenna is connected to the several signal generators via the at least one combiner. The at least one transmission antenna may be part of an antenna array comprising several transmission antennas. In that case, the several transmission antennas may be connected to the signal generators via one or several signal dividers, one or several signal combiners and/or one or several switches being configured to selectively connect at least one of the signal generators to at least one of the transmission antennas.

In a certain embodiment of the disclosure, the controller is configured to control the several signal generators to generate signals being coherent to each other. This way, the interference between the individual signals generated by different signal generators and its influence on the electromagnetic environment is predictable and does not alter randomly over time.

The signal generators may be configured to perform pulse descriptor word (PDW) streaming, for example with a streaming rate of at least 1.5 million PDW/sec, for example of at least 2.5 million PDW/sec. This enables the signal generators to efficiently communicate with the controller and/or with the at least one transmission antenna, which is particularly useful when a complex electromagnetic environment is to be simulated.

In another embodiment of the disclosure, the controller comprises a second machine learning module, the second machine learning module being configured to automatically adapt the set of parameters. The second machine learning module enables the controller to learn how to train the radar device in a particularly fast and/or efficient manner. Moreover, the second machine learning module also enables the controller to learn how to train different types of radar devices, such that the training system can easily be adapted to train the different kinds of radar devices.

For example, the first and second machine learning modules form kind of a generative adversarial network. The term "kind of a generative adversarial network" is understood to mean the following: The first machine learning module tries to correctly identify and/or classify the information contained in the test signal and/or to generate an appropriate response of the vehicle. At the same time, the second machine learning module tries to generate a set of parameters that leads to errors of the first machine learning module being as big as possible. Put another way, the second machine learning module learns how to generate sets of parameters that are particularly hard to identify for the first machine learning module. This way, the two machine learning modules sort of train each other without further input of the user being needed.

According to one aspect of the disclosure, the first machine learning module and the second machine learning module each comprise an artificial neural network, wherein the two artificial neural networks form a generative adversarial network. More specifically, the artificial neural network of the first machine learning module tries to correctly identify and/or classify the information contained in the test signal and/or to generate an appropriate response of the vehicle. At the same time, the artificial neural network of the second machine learning module tries to generate a set of parameters that leads to errors of the first machine learning module being as big as possible. Put another way, the artificial neural network of the second machine learning module learns how to generate sets of parameters that are particularly hard to identify for the artificial neural network of the first machine learning module. This way, the two artificial neural networks sort of train each other without input of a user being needed.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
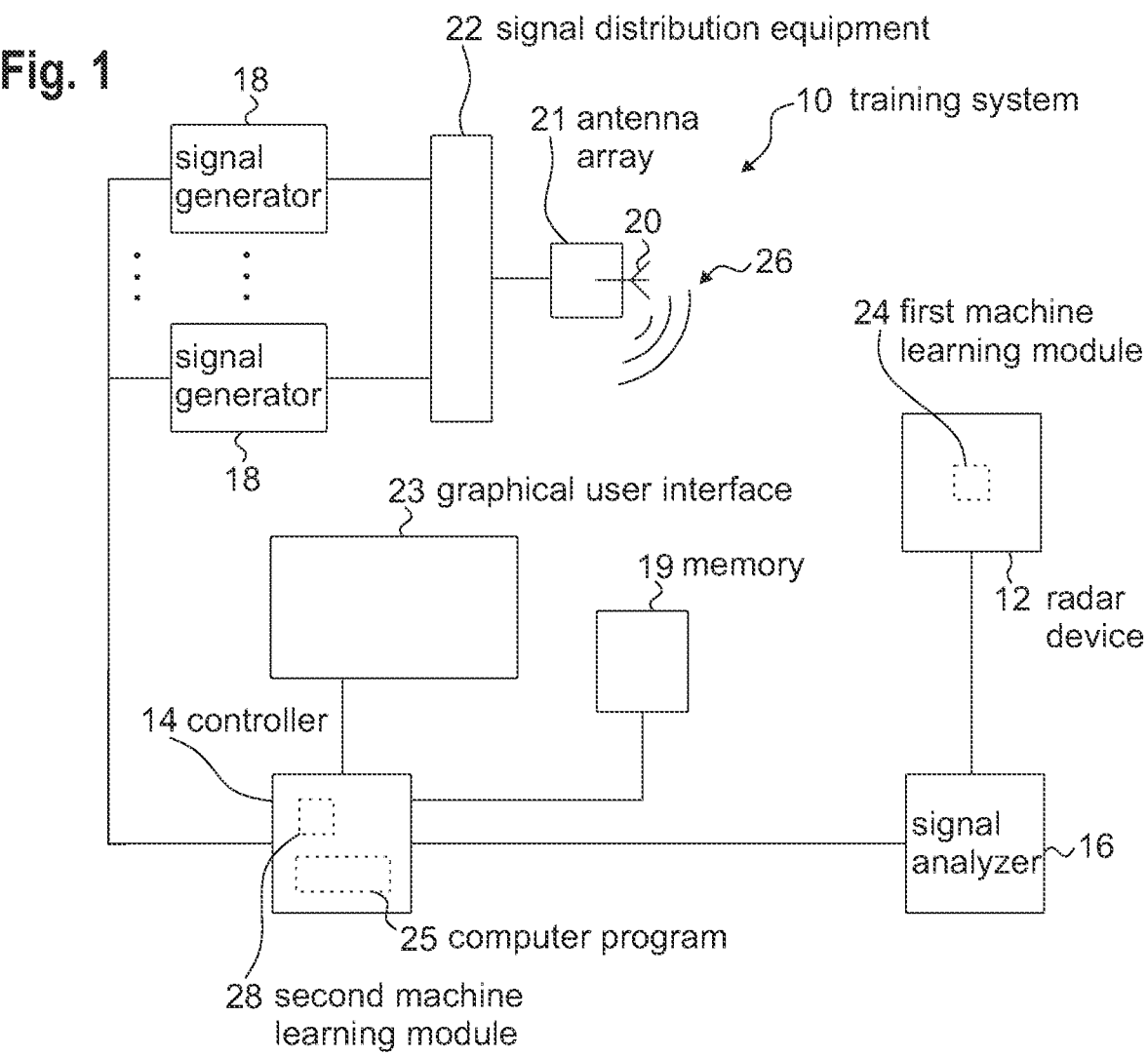
FIG. 1 schematically shows a representative embodiment of a training system according to the disclosure.

FIG. 1 schematically shows a training system 10 for training a radar device 12, comprising a controller 14 being connected to a signal analyzer 16, to several signal generators 18 and to a memory 19. Moreover, the training system 10 comprises at least one transmission antenna 20.

In the shown embodiment, an antenna array 21 is provided that comprises the at least one transmission antenna 20. The antenna array 21 is connected to the signal generators 18 via signal distribution equipment 22, which signal distribution equipment 22 may comprise one or several signal combiners and/or one or several signal dividers.

Additionally, the training system 10 may comprise a graphical user interface 23 (GUI) being connected to the controller 14. The graphical user interface 23 allows a user to input control commands to the training system 10. Moreover, data relevant to the user may be displayed on the graphical user interface 23.

The radar device 12 is established as a radar system for use in an airplane, in a car or in another vehicle, being operable in the radio frequency range up to the $K_a$ band, i.e. up to about 40 GHz. In the following, the term "vehicle" is to be understood to include all kinds of airborne, land-based and waterborne vehicles.

Figure 2:
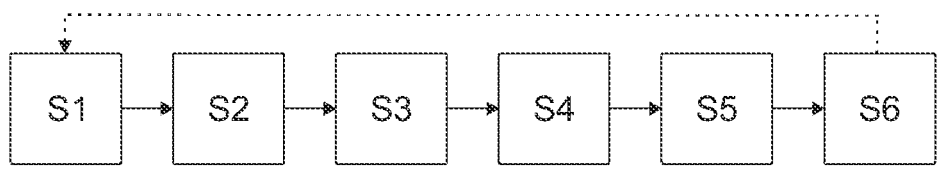
FIG. 2 shows a schematic flowchart of a representative method for training a radar device according to the disclosure.

The radar device 12 comprises a first machine learning module 24 that is to be trained to automatically control certain subsystems of the vehicle or even fully control the vehicle. The training of the first machine learning module 24 is achieved by the method that is described in the following with reference to FIG. 2.

First, the controller 14 or rather a computer program 25 running on the controller 14 causes the signal generators 18 to generate at least one wireless test signal 26 via the antenna array 21 based on an initial set of parameters corresponding to at least one object being located in the field of view of the radar device 12 (step S1). Therein, the set of parameters comprises information on one or several objects, for example a number of the objects, a radar cross section of at least one of the objects, a position of at least one of the objects, a velocity of at least one of the objects, and acceleration of at least one of the object, and emission characteristic of at least one of the objects, a communication signal being transmitted to the vehicle, an interfering transmitter and/or background noise.

The initial set of parameters may be generated by the controller 14, loaded from a database stored in the memory 19 of the training system 10, read from another storage medium being connected to the training system 10 and/or manually input by the user via the graphical user interface 23.

In other words, the controller 14 or rather the computer program 25 running on the controller 14 controls the signal generators 18 to simulate an electromagnetic environment corresponding to a particular situation the vehicle may be in. Such a situation usually comprises several objects emitting and/or reflecting electromagnetic waves such that usually there are signals reaching the radar device 12 from several different angles of arrival and directions of arrival.

Correspondingly, the signal generators 18 simulate the reflection of radar pulses (sent out by the radar device 12) by objects located in the field of view of the radar device 12, an active emission of signals by the objects, for example in the form of a communication signal or of an interference signal, and/or electromagnetic background noise being present in the field of view of the radar device 12. Such a simulator may also be called "pulse sequencer".

In order to correctly simulate the electromagnetic environment, the signal generators 18 are controlled by the controller 14 to generate signals being coherent to each other, such that the interference between the individual signals and its influence on the electromagnetic environment is predictable and does not alter randomly over time.

Moreover, due to the possibly complex situations that are to be simulated, the signal generators 18 have to be configured to efficiently communicate with the controller 14 and/or the antenna array 21 with a high data rate. Thus, the signal generators 18 are configured to perform pulse descriptor word (PDW) streaming with a streaming rate of for example at least 1.5 million PDW/sec, for example of at least 2.5 million PDW/sec.

Thus, the wireless test signal 26 is radiated by the antenna array 21 to the radar device 12. Alternatively, the wireless test signal 26 may be coupled into a radio frequency waveguide and conducted to the radar device 12 by the waveguide.

The wireless test signal 26 is received and processed by the radar device 12 (step S2). More specifically, the radar device 12 or rather the first machine learning module 24 extracts relevant information from the test signal 26. Thus, the first machine learning module 24 tries to identify and/or classify a source or sources of the test signal 26. In some embodiments, the first machine learning module 24 identifies and classifies the sources into categories being relevant to the particular kind of vehicle, such as pedestrians, road marks and/or other traffic participants in the case of the vehicle being a car, or other airplanes, mountains and/or other changes in landscape in the case of the vehicle being an airplane.

Additionally, the first machine learning module 24 may evaluate whether a subsystem of the vehicle or the vehicle as a whole has to be controlled in a certain way in response to the test signal 26 received. In some embodiments, the first machine learning module 24 may generate control commands for other subsystems of the vehicle corresponding to an evasive manoeuvre if the received test signal 26 suggests that one of the objects approaches the vehicle with a high velocity.

All of the information stated above, i.e. the classification obtained by the first machine learning module 24 and the corresponding control commands that the radar device 12 would send to other subsystems of the vehicle, are combined into a feedback signal being generated by the rate of device 12 and being forwarded to the signal analyser 16 (step S3). In other words, the feedback signal comprises all relevant information on how the radar device 12 reacts to the test signal 26.

The signal analyzer 16 then analyzes the feedback signal (step S4). In some embodiments, the signal analyzer 16 compares the response of the radar device 12 or rather of the first machine learning module 24 to the "real" situation being described by the initial set of parameters. In other words, the signal analyzer 16 checks whether the first machine learning module 24 has classified the objects correctly and whether the corresponding control commands are appropriate.

Based on this comparison, machine learning techniques may be applied in order to enhance the recognition rate of the first machine learning module 24. For example, if the first machine learning module 24 comprises an artificial neural network (ANN), an error corresponding to a discrepancy between the classification and/or the response obtained by the first machine learning module 24 and an actual classification and/or actual (appropriate) response may be obtained and weighting factors of the artificial neural network may be adapted by backward propagation of the error.

The feedback signal and/or the result of the analysis of the feedback signal are/is then forwarded to the controller 14 (step S5). Based on the feedback signal and/or the result of the analysis of the feedback signal the controller 14 or rather the computer program 25 running on the controller 14 automatically adapts the set of parameters (step S6), and the steps described above are repeated with the new set of parameters.

By adjusting the set of parameters, also the properties of the test signal 26 are adjusted as the new set of parameters corresponds to a set of objects with different properties. For example, at least one of the frequency of the test signal 26, the amplitude of the test signal 26, a waveform of the test signal 26, an emission mode (e.g. pulsed or continuous, object is only reflecting or emits actively), a power level of the test signal 26 and a pulse width of the test signal 26 is adjusted. The term "changing the frequency of the test signal 26" is understood to both include frequency hops, i.e. sudden and larger changes in frequency, as well as smaller changes in frequency.

The cycle consisting of steps S1 to S6 may be repeated several times such that the first machine learning module 24 is automatically trained to correctly identify the plurality of different situations, wherein in each cycle the controller 14 automatically adapts the training data for the first machine learning module 24. Thus, the training of the first machine learning module 24 is performed completely automatically without a need for additional input by the user.

However, the user may be allowed to manually change at least parts of the set of parameters via the graphical user interface 23.

In a particular embodiment of the training system 10, the controller 14 comprises a second machine learning module 28 being trained to automatically adapt the set of parameters such that the first machine learning module 24 is trained in a particularly efficient fashion.

More specifically, the radar device 12 and the controller 14 each comprise an artificial neural network that together form a generative adversarial network. Thus, the artificial neural network of the first machine learning module 24 tries to correctly classify the information contained in the test signal 26 and to generate an appropriate response of the vehicle while the artificial neural network of the second machine learning module 28 tries to generate a set of parameters that leads to errors of the first machine learning module 24 being as big as possible. This way, both artificial neural networks are trained at the same time and in an unsupervised fashion.

As described above, one or more aspects of the methods described herein are carried out in one or more computer systems. In this regard, a program element is provided, which is configured and arranged when executed on a computer to carry out any one of the method claims 1-8.

The program element may be installed in a computer readable storage medium. The computer readable storage medium may be any one of the computing devices, control units, controllers, signal analyzers, signal processors, first and/or second training modules, etc., described elsewhere herein or another and separate computing device, control unit, controllers, signal analyzers, signal processors, first and/or second training modules, etc., as may be desirable. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like, as have been described elsewhere herein. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

\Various embodiments are described above with reference to block diagrams and flowchart illustrations of apparatuses, methods, systems, computer program products, etc. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

According to various embodiments, many individual steps of a process may or may not be carried out utilizing the computer systems and/or servers described herein, and the degree of computer implementation may vary, as may be desirable and/or beneficial for one or more particular applications.

The present application may include references to directions, such as "forward," "rearward," "front," "rear," "upward," "downward," "top," "bottom," "right hand," "left hand," "lateral," "medial," "distal," "proximal," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for training a radar device using a training system, the radar device comprising a first machine learning module to be trained, the training system comprising at least one signal generator, a signal analyzer and at least one controller being connected to both the at least one signal generator and the at least one signal analyzer, with the following steps:
    causing, by a controller, the at least one signal generator to generate at least one wireless test signal based on an initial set of parameters corresponding to at least one object being located in the field of view of the radar device;
    receiving the at least one wireless test signal by the radar device;
    generating a feedback signal by the radar device based on the test signal, wherein the feedback signal comprises an identification or classification of the at least one object generated by the first machine learning module;
    forwarding the feedback signal to the signal analyzer; and
    adapting, automatically, the initial set of parameters by the controller based on the feedback signal such that the first machine learning module is automatically trained to correctly identify or classify objects in the field of view of the radar device.

2. The method of claim 1, wherein the set of parameters comprises information on at least one of a number of objects, a radar cross section of said at least one object, a position of said at least one object, a velocity of said at least one object, an acceleration of said at least one object, an emission characteristic of said at least one object, a communication signal, an interfering transmitter and background noise.

3. The method of claim 1, wherein the test signal is adjusted based on the adapted parameter set, wherein the adjustment comprises changing at least one of a frequency of the test signal, an amplitude of the test signal, a waveform of the test signal, an emission mode, a power level of the test signal and a pulse width of the test signal.

4. The method of claim 1, wherein the initial set of parameters is at least one of generated by the controller, loaded from a database stored in a memory of the training system, read from a storage medium and manually input by a user.

5. The method of claim 1, wherein the controller comprises a second machine learning module, wherein the set of parameters is automatically adapted by the second machine learning module.

6. The method of claim 5, wherein the first machine learning module and the second machine learning module are both trained unsupervised.

7. The method of claim 5, wherein the first and second machine learning module form a generative adversarial network.

8. The method of claim 7, wherein the first machine learning module and the second machine learning module each comprise an artificial neural network, wherein the two artificial neural networks form the generative adversarial network.

9. A non-transitory computer readable medium for training a radar device using a training system, the radar device comprising a first machine learning module to be trained, the training system comprising at least one signal generator, a signal analyzer and at least one controller being connected to both the at least one signal generator and the at least one signal analyzer, the non-transitory computer readable medium having a program code being adapted to cause the training system to perform the following steps when executed as the at least one controller:
- generating at least one wireless test signal via the at least one signal generator based on an initial set of parameters corresponding to at least one object being located in the field of view of the radar device; and
- automatically adapting the set of parameters based on a feedback signal being generated by the radar device based on the test signal and being forwarded to the signal analyzer, such that the first machine learning module is automatically trained to correctly identify or classify objects in the field of view of the radar device, wherein the feedback signal comprises an identification or classification of the at least one object generated by the first machine learning module.

10. The non-transitory computer readable medium of claim 9, further comprising a program code being adapted to cause the training system to at least one of generate the initial set of parameters, load the initial set of parameters from a database stored in a memory of the training system and read the initial set of parameters from a storage medium when the computer program is run on the at least one controller.

11. The non-transitory computer readable medium of claim 9, wherein the computer readable medium is at least partly established as a second machine learning module being configured to automatically adapt the set of parameters.

12. The non-transitory computer readable medium of claim 9, wherein the computer readable medium is at least partly established as an artificial neural network, wherein the first machine learning module comprises another artificial neural network, and wherein the two artificial neural networks together form a generative adversarial network.

13. A training system for training a radar device, the radar device comprising a first machine learning module to be trained, the training system comprising:
- at least one signal generator, a signal analyzer and at least one controller being connected to both the at least one signal generator and the at least one signal analyzer,
- the controller being configured to control the at least one signal generator to generate at least one wireless test signal based on an initial set of parameters corresponding to a at least one object being located in the field of view of the radar device,
- the radar device being configured to receive and process said test signal to generate a feedback signal, wherein the feedback signal comprises an identification or classification of the at least one object generated by the first machine learning module, the radar device being further configured to forward the feedback signal to the signal analyzer, and
- the controller further being configured to automatically adapt the set of parameters based on the feedback signal such that the first machine learning module is automatically trained to correctly identify or classify objects in the field of view of the radar device.

14. The training system of claim 13, comprising several signal generators, at least one combiner and at least one transmission antenna, wherein the at least one transmission antenna is connected to the several signal generators via the at least one combiner.

15. The training system of claim 14, wherein the controller is configured to control the several signal generators to generate signals being coherent to each other.

16. The training system of claim 13, wherein the controller comprises a second machine learning module, the second machine learning module being configured to automatically adapt the set of parameters.

17. The training system of claim 16, wherein the first and second machine learning module form a generative adversarial network.

18. The training system of claim 16, wherein the first machine learning module and the second machine learning module each comprise an artificial neural network, wherein the two artificial neural networks form a generative adversarial network.

* * * * *